United States Patent [19]

Göbler

[11] 4,290,258
[45] Sep. 22, 1981

[54] LAWNMOWER BLADES

[76] Inventor: Hans Göbler, Kirchstrasse 8, 5231 Woldert, Fed. Rep. of Germany

[21] Appl. No.: 152,310

[22] Filed: May 22, 1980

[30] Foreign Application Priority Data

May 25, 1979 [DE] Fed. Rep. of Germany ....... 2921249

[51] Int. Cl.³ ........................................... A01D 55/18
[52] U.S. Cl. .................................................. 56/295
[58] Field of Search ....................................... 56/295

[56] References Cited

U.S. PATENT DOCUMENTS

| 2,969,634 | 1/1961 | Lannert | 56/295 |
| 3,869,848 | 3/1975 | Larson | 56/295 |
| 3,910,017 | 10/1975 | Thorud et al. | 56/295 |
| 4,189,903 | 2/1980 | Jackson et al. | 56/295 |

FOREIGN PATENT DOCUMENTS

| 266830 | 12/1966 | Australia | 56/295 |
| 7623172 | of 0000 | Fed. Rep. of Germany . | |
| 2800546 | 7/1978 | Fed. Rep. of Germany . | |

Primary Examiner—Jay N. Eskovitz
Attorney, Agent, or Firm—Cushman, Darby & Cushman

[57] ABSTRACT

An improved lawnmower blade for cutting in a substantially horizontal position, of the type including a strip of metal having a substantially flat central region and end portions provided with cutting edges on opposite sides of the blade, the cutting edges being at a level lower than the central region in the position of operation and extending substantially parallel to the surface thereof and being joined by transitional zones to the surface of the central region; these transitional zones extend at the ends of the blade, from the cutting edges to the trailing edges of the blade respectively and which are progressively shorter with increasing distance from the ends. The improvement provides a hump formed in the blade, associated with each transitional zone, for aiding in the ejection of grass from a lawnmower. Each hump merges with its associated transitional zone and is directed towards its associated trailing edge. Advantageously, each hump has an open mouth directed towards its associated trailing edge. The humps are preferably integral with the blade itself.

4 Claims, 1 Drawing Figure

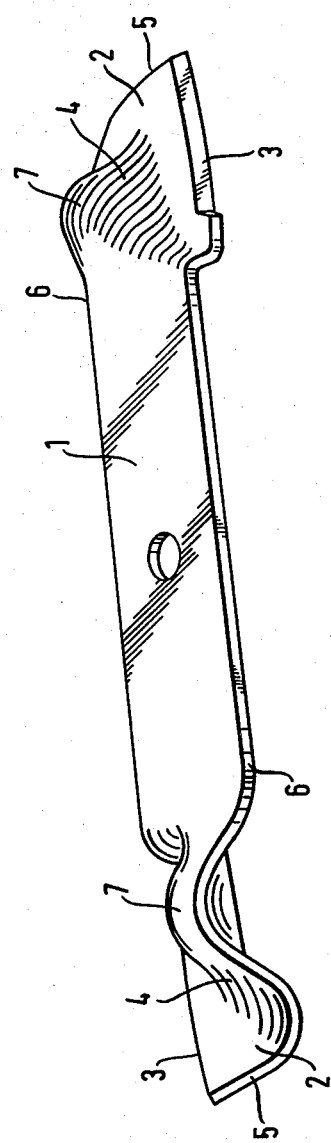

LAWNMOWER BLADES

BACKGROUND OF THE INVENTION

The present invention relates to lawnmower blades arranged to cut in a substantially horizontal position, of the kind which comprise a strip of metal having a substantially flat central region and end portions provided with cutting edges on opposite sides of said blade, said cutting edges being at a level lower than said central region in the position of operation and extending substantially parallel to the surface of said central region and being joined by transitional zones to the surface thereof, said transitional zones extending at the ends of said blade, from said cutting edges to the trailing edges of said blade respectively and being progressively shorter with increasing distant from said end.

A blade of this type is described in my German Gebrauchsmuster specification No. DE-GM 78 34 512, and is entirely flat and is characterized by being extremely quiet in operation. However, this known blade has the disadvantage that the force provided to the grass is not very high. It would be desirable to increase this force so as to provide a more complete conveyance of grass in the outward direction.

It is an object of the invention to provide such a blade which will not only be quiet in operation but will exhibit a greater grass-ejection force than the previously known blade.

SUMMARY OF THE INVENTION

To achieve this and other objects, in a blade of the kind hereinabove referred to, the blade according to the present invention is provided with a hump located near but spaced from each end of said blade, each hump merging with the adjacent said transitional zone and being directed towards the trailing edges of the blade, respectively.

It has been found that the presence of the hump is able to increase the ejection force without disadvantageously influencing the smooth running motion of the blade.

The humps advantageously have open mouths directed towards the trailing edges of the blade.

Advantageously the humps are integral with the blade itself.

Preferably, the highest point of each hump is spaced from said central region by an amount approximately equal to the amount by which the cutting edges are lower than said central region in the position of use.

BRIEF DESCRIPTION OF THE DRAWING

In order that the invention may be more clearly understood reference will now be made to the single FIGURE of the accompanying drawing which represents a perspective view of one embodiment thereof by way of non-liminative example.

DETAILED DESCRIPTION OF PREFERRED EMBODIMENT

Referring now to the drawing, there is shown a lawnmower blade for horizontal cutting comprising a strip of metal having a flat central area 1. To the central area 1 are connected end portions 2 with cutting edges 3 on opposite sides. The cutting edges 3 are lower than the surface of the central region 1, to such an extent that they extend basically parallel to this region. Between the cutting edges 3 and the surface of the central region are provided flowing transition zones 4 which extend at the ends 5 of the horizontal blade, from the cutting edge 3 to the trailing edge 6 of the blade in the position of operation in each case and becoming progressively shorter with increasing distance from the ends 5.

Spaced from the ends 5 and connected to the transitional zones 4, the blade in each case has a hump 7 which is directed towards the trailing edge 6 and has an open mouth at this point. The humps 7 are formed integrally with the blade i.e. the whole blade is formed in one piece. At their highest point the humps 7 are spaced above the surface of the central area 1 by an amount which is approximately the same as the cutting edges are below this surface in the position of use.

I claim:

1. In a lawnmower blade arranged to cut in a substantially horizontal position, of the kind which comprises a strip of metal having a substantially flat central region and end portions provided with cutting edges on opposite sides of said blade, said cutting edges being at a level lower than said central region in the position of operation and extending substantially parallel to the surface of said central region and being joined by transitional zones to the surface of said central region, said transitional zones extending, at the ends of said blade, from said cutting edges to the trailing edges of said blade respectively and being progressively shorter with increasing distance from said ends, the improvement comprising: providing a hump positioned near and spaced from each end of said blade, each of said humps merging with its associated adjacent transitional zone and being directed towards said trailing edges of said blade respectively, the humps enhancing the grass ejecting force of the blade without substantially increasing the air rupture and its attendant noise when the blade is in use.

2. An improvement according to claim 1, wherein said humps each have an open mouth directed towards the respectively trailing edge of said blade.

3. An improvement according to claim 1, wherein said humps are integral with the blade itself.

4. An improvement according to claim 1, wherein the highest point of each said hump is spaced above the surface of said central region by approximately the same amount as each said cutting edge is below said surface of said central region in the position of use.

* * * * *